United States Patent [19]

Marui

[11] Patent Number: 5,879,050
[45] Date of Patent: Mar. 9, 1999

[54] SADDLE FOR THE USE ON BICYCLE

[75] Inventor: Shigeki Marui, Kobe, Japan

[73] Assignee: Marui Co., Ltd., Kobe, Japan

[21] Appl. No.: 40,356

[22] Filed: Mar. 13, 1998

[30] Foreign Application Priority Data

Mar. 18, 1997 [JP] Japan .................................. 9-064190

[51] Int. Cl.⁶ ..................................................... B62J 1/10
[52] U.S. Cl. ........................................ 297/204; 297/195.1
[58] Field of Search .............................. 297/284.1, 195.1, 297/204, 205, 206, 214

[56] References Cited

U.S. PATENT DOCUMENTS

| 495,442 | 4/1893 | True . |
| 535,018 | 3/1895 | Perry . |
| 1,271,375 | 7/1918 | Saunders . |
| 1,391,409 | 9/1921 | Roberts . |
| 4,099,769 | 7/1978 | Jacobs . |

*Primary Examiner*—Milton Nelson, Jr.
*Attorney, Agent, or Firm*—Rabin & Champagne, P.C.

[57] ABSTRACT

A saddle for use on a bicycle has an elastically deformable saddle body formed of a top plate forming the top wall of the saddle and a side plate hanging down from the periphery, and five binding bands laid over between a pair of opposite walls facing each other in the lateral direction in the saddle body in the component wall of the side plate. The degree to which the binding bands are tightened can be changed to adjust the cushioning property and the form of the saddle according to driver's preference etc.

7 Claims, 4 Drawing Sheets

SADDLE FOR THE USE ON BICYCLE

BACKGROUND OF THE INVENTION

1. Field of the Invention

The present invention relates to bicycles, and particularly to a saddle for use on a racing bicycle, for example.

2. Description of the Background Art

Since the cushioning property of a saddle for use on a bicycle determines whether the bicycle is comfortable to ride on, improving the cushioning property is extremely important to improve the quality of the entirety of the bicycle.

FIG. 7 is a side view showing a conventional saddle for use on a bicycle.

This bicycle saddle has an elastically deformable dome-like saddle body (1) and base wire (21), like a spring rod, mounted on the bottom surface of the saddle body (1) and fixed on the seat post (7). The saddle body (1) further includes a top plate (11) forming the top wall and a side plate (12) hanging down from its periphery.

When a rider sits on the top plate (11) of the saddle body (1), the body weight of the rider causes the top plate (11) to elastically deform, or to cave in in the center. It also causes the side plate (12) hanging down from the periphery of the top plate (11) to elastically deform so as to fanwise spread out. Then the top plate (11) and the side plate (12) produce an elastic recovery force to recover their original form, which elastically supports the body of the rider on the saddle body (1) as cushion.

The quantity of deformation of the saddle body (1) with the rider seated thereon depends on the body weight of the rider. Accordingly, even with the same bicycle saddle, the cushioning property exerted by the saddle body (1) varies depending on the body weight of the rider.

Furthermore, since evaluation of the cushioning property varies from person to person, the comfortableness of bicycle saddles with the same shape will be evaluated in a variety of ways among riders.

Thus the basis of evaluation of the cushioning property of bicycle saddles varies depending on the weight, preference, etc. of the rider.

From this point of view, it is desired that the quantity of elastic deformation, or the cushioning property, of the saddle body (1) caused when a rider is seated thereon can be individually adjusted in accordance with weights and preferences about the cushioning property of the individual drivers.

With conventional bicycle saddles, however, it is impossible to adjust the quantity of elastic deformation or the cushioning property of the saddle body (1) when a rider is seated. Hence, especially with racing bicycles, riders are required to find bicycle saddles having cushioning properties suited to their own body weights and preferences from among a variety of bicycle saddles available on the market. However, it is extremely difficult to find such agreeable saddles for bicycles.

SUMMARY OF THE INVENTION

An object of the present invention is to provide a saddle for use on a bicycle having a cushioning property adjustable according to rider's preference etc.

Another object of the present invention is to provide a saddle for use on a bicycle whose shape can be adjusted according to rider's preference.

Still another object of the present invention is to provide a saddle for use on a bicycle that can easily hold the same cushioning property or favorable form.

To achieve the objects above, a saddle for use on a bicycle according to a first aspect of this invention includes a saddle body capable of being elastically deformed and having a top plate forming the top wall of the saddle and a side plate hanging down from the periphery of the top plate, and degree-of-deformation adjusting means for adjusting the degree of deformation of the saddle body caused by a rider seated on the saddle body.

With the saddle for use on a bicycle constructed as stated above, it is possible to suppress deformation of the saddle body when a driver is seated and also to adjust the degree of deformation with the degree-of-deformation adjusting means. Accordingly, it is possible to adjust the elastic deformation capability of the saddle body and to adjust the cushioning property of the bicycle saddle according to a rider's preference etc.

To achieve the objects above, a saddle for use on a bicycle according to a second aspect of this invention includes an elastically deformable saddle body having a top plate forming the top wall of the saddle and a side plate hanging down from the periphery of the top plate, and shape adjusting means for holding a force applied to the saddle body to adjust the shape of the saddle body.

With the saddle for use on a bicycle constructed as stated above, it is possible to hold the force applied to the elastically deformable saddle body, so that the rider can use the saddle body in a favorite shape.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
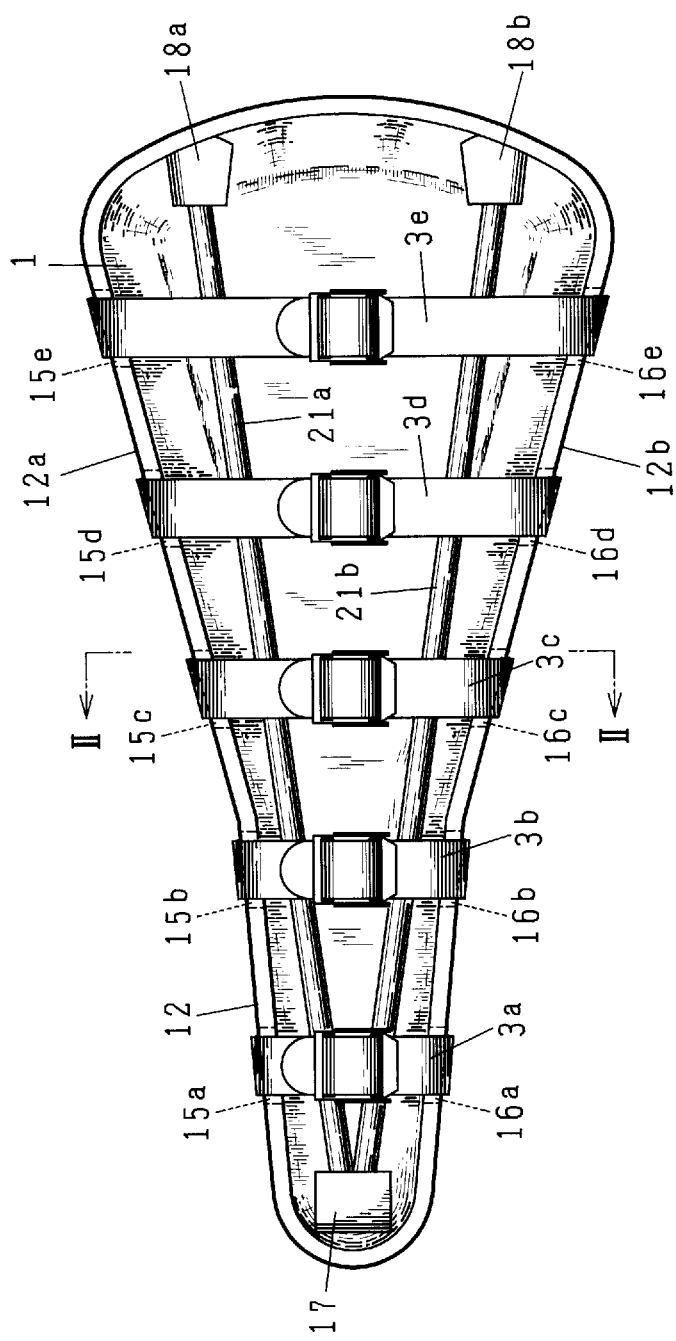
FIG. 1 is a bottom view showing a saddle for use on a bicycle according to a first embodiment of the present invention.

FIG. 1 is a bottom view of a saddle for use on a bicycle according to a first embodiment of the present invention.

Referring to the diagram, this bicycle saddle includes a saddle body (1), a pair of base wires (21a),(21b) laid in the longitudinal direction on the bottom of the saddle body, and binding bands (3a) to (3e) as degree-of-deformation adjusting means.

Figure 2:
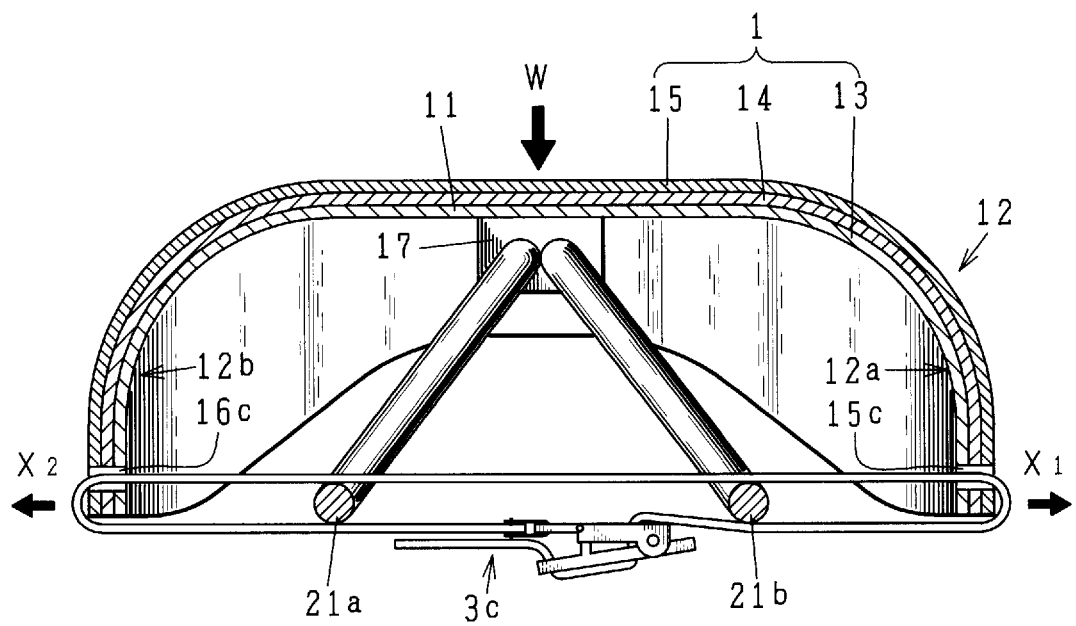
FIG. 2 is the cross-sectional view taken along the line II—II in FIG. 1.

FIG. 2 shows the section along the line II—II in FIG. 1.

Referring to the drawing, the entirety of the saddle body (1) is formed in a dome-like shape with a top plate (11) forming the top wall of the saddle and a side plate (12) hanging down from its periphery.

The saddle body (1) is formed of a base (13) made of elastic resin, a sponge (14) covering the outside surface of the base (13), and a cover (15) covering the outside surface of the sponge (14). Accordingly, the entirety of the saddle body (1) has elasticity.

Figure 3:
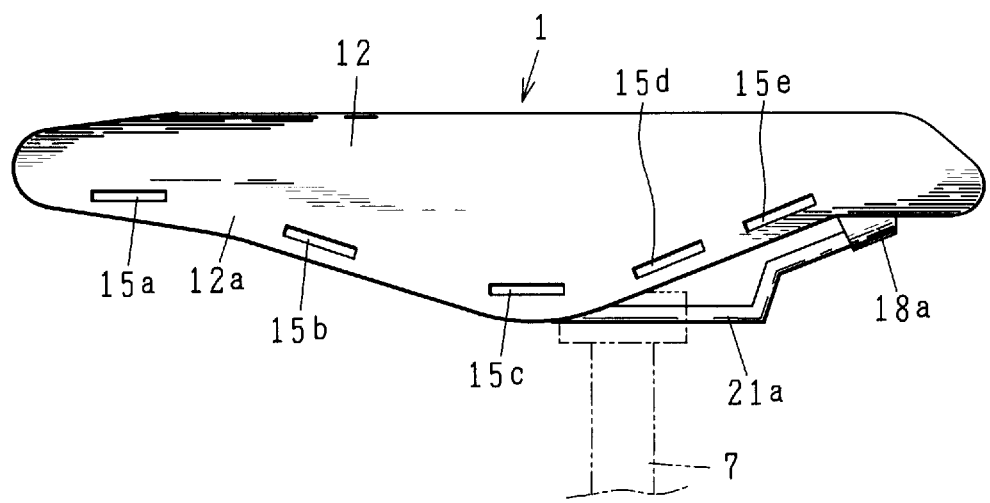
FIG. 3 is a side view showing the bicycle saddle shown in FIG. 1 with the binding bands (3a) to (3e) removed.

FIG. 3 is a side view showing the saddle body (1) shown in FIG. 1 and FIG. 2.

As shown in FIG. 3 and FIG. 1, in the component wall of the side plate (12) hanging down from the periphery of the saddle body (1), a pair of opposite walls (12a),(12b) facing each other laterally in the saddle body (1) have rectangular band insertion holes (15a) to (15e), (16a) to (16e) arranged along their lower sides. The band insertion holes (15a) to (15e) formed in one (12a) of the laterally facing opposite walls in the component wall of the side plate (12) and the band insertion holes (16a) to (16e) formed in the other one (12b) of the opposite walls face each other in a one-to-one correspondence.

As shown in FIG. 1 and FIG. 2, the ends of the base wires (21a),(21b) are individually inserted between a front projection (17) projecting downward from the vicinity of the front end of the saddle body (1) and rear projections (18a),(18b) projecting downward from the vicinity of the rear end of the saddle body (1). These base wires (21a),(21b) are formed of metal rods made of a spring steel material, which are fixed on the top end of the seat post (7) of the body of the bicycle (refer to FIG. 3) to hold the saddle body (1) on the seat post (7).

The binding bands (3a) to (3e) as degree-of-deformation adjusting means have the same structure.

Figure 4:
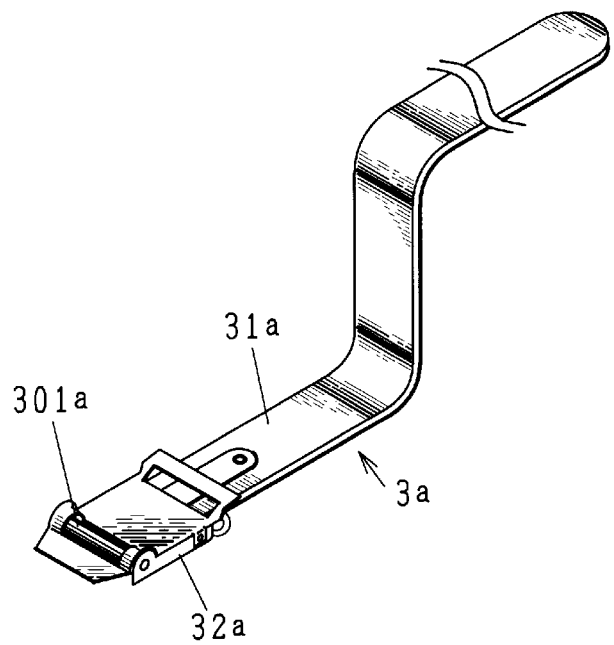
FIG. 4 is a partially omitted perspective view showing the binding band (3a) applied to the bicycle saddle in FIG. 1.

FIG. 4 is a partially omitted perspective view showing the binding band (3a).

Figure 5:
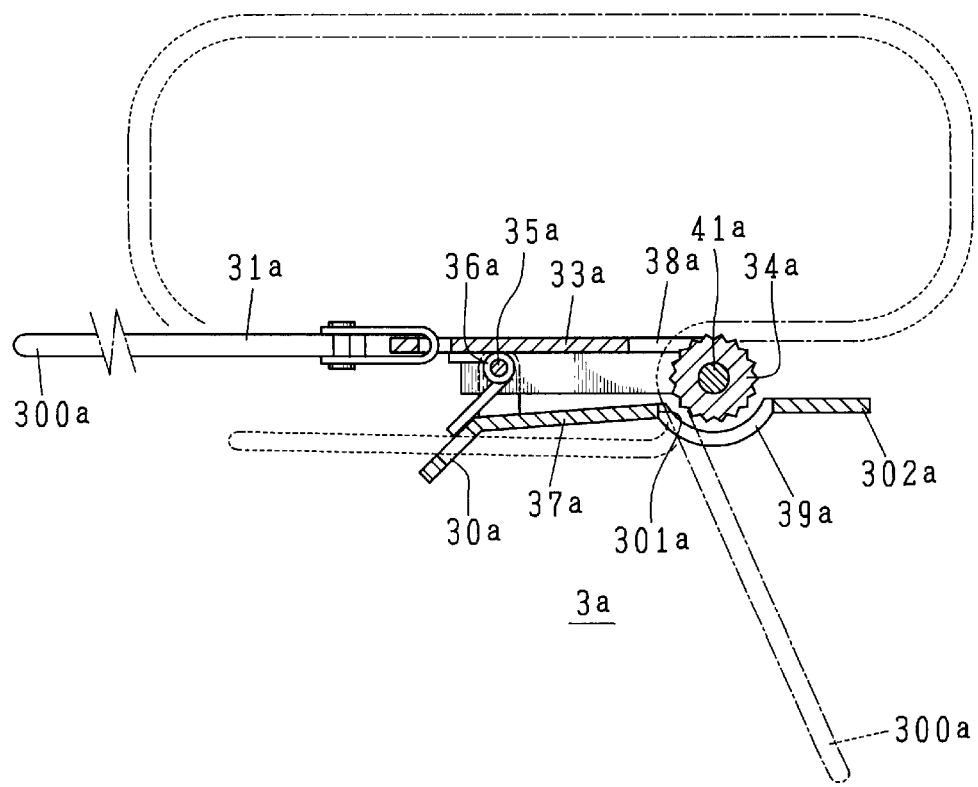
FIG. 5 is a sectional view showing the structure of the adjusting fitting (32a) of the binding band (3a) shown in FIG. 4.

An adjusting fitting (32a) is attached at one end of the band (31a). As shown in FIG. 5, the adjusting fitting (32a) is formed of a base part (33a) having a roller (34a) rotatably supported on the shaft (41a) at the front end, and a cover plate (37a) rotatably supported on the shaft (35a) at the rear end of the base part (33a) and energized in the closing direction (in the counterclockwise direction in FIG. 5) by the kick spring (36a).

The base part (33a) and the cover plate (37a) have band insertion holes (38a),(39a) located at opposite sides of the roller (34a). The cover plate (37a) also has a band insertion hole (30a) at its rear end.

Next, actual usage of the bicycle saddle described above will be described.

First, the base wires (21a),(21b) are fixed on the seat post (7) of the body of the bicycle as shown by the imaginary line in FIG. 3.

Next, the band (31a) of the binding band (3a) is inserted into the band insertion holes (15a),(16a) formed in the pair of opposite walls (12a),(12b) of the side plate (12) of the saddle body (1). Then the leading end (300a) of the band (31a) is pulled through the band insertion hole (38a) of the base part (33a) and the band insertion hole (39a) of the cover plate (37a) as shown by the imaginary line in FIG. 5. Then the binding band (3a) is pinched between the roller (34a) and the inner edge (301a) of the band insertion hole (39a) of the cover plate (37a), which prevents the binding band (3a) from becoming loose. The side plate (12) is thus bound.

After binding, as shown by the dotted line in the drawing, the leading end (300a) of the band (31a) is inserted in the band insertion hole (30a) in the cover plate (37a). Similarly, the other binding bands (3b) to (3e) are attached through the band insertion holes (15b) to (15e) and (16b) to (16e). Then, as shown in FIG. 1, the binding bands (3a) to (3e) are attached through the band insertion holes (15a) to (15e) and (16a) to (16e) across the lower ends of the side plate (12) of the saddle body (1).

When a rider sits down on the saddle body (1) and the body weight W acts on its top surface as shown in FIG. 2, the saddle body (1) is depressed down in the center, and the lower ends of the opposite walls (12a),(12b) of the side plate (12) hanging down from the periphery of the saddle body (1) attempt to deform in the directions X1 and X2. That is to say, the lower ends of the opposite walls (12a),(12b) attempt to deform fanwise. However, the deformation of the entire saddle body (1) is restricted since the binding bands (3a) to (3e) inhibit the deformation of the opposite walls (12a), (12b).

It is possible to adjust the degree (the interval between the opposite walls (12a),(12b)) to which the lower ends of the opposite walls (12a),(12b) deform fanwise when the rider is seated by adjusting the degree to which the binding bands (3a) to (3e) bind the lower ends of the opposite walls (12a),(12b) of the side plate (12). That is to say, it is possible to adjust the cushioning property of the saddle body (1) according to weight and preference of the driver. It can be said, from the viewpoint of dynamics, that this cushioning property is obtained by holding the section modulus of the base (13), which exerts the elastic force of the saddle body (1), in the section shown in FIG. 2 at a desired value when a rider is seated. The binding force of the binding band (3a) or the like can be loosed by operating the front end (302a) of the cover plate (37a) to separate the front end (302a) from the roller (34a). Then the gap between the inner edge (301a) of the band insertion hole (39a) and the roller (34a) is enlarged to release the band (31a).

With the bicycle saddle according to the above-described embodiment, not only the cushioning property but also the dimension in the width direction and the shape of the saddle body (1) can be somewhat adjusted by adjusting how tight and in which manner the binding bands (3a) to (3e) are fastened. That is to say, it is possible to transform, to some extent, the saddle body (1) into a comfortable-to-sit-on shape to suit to the shape of the rider's body.

Figure 6:
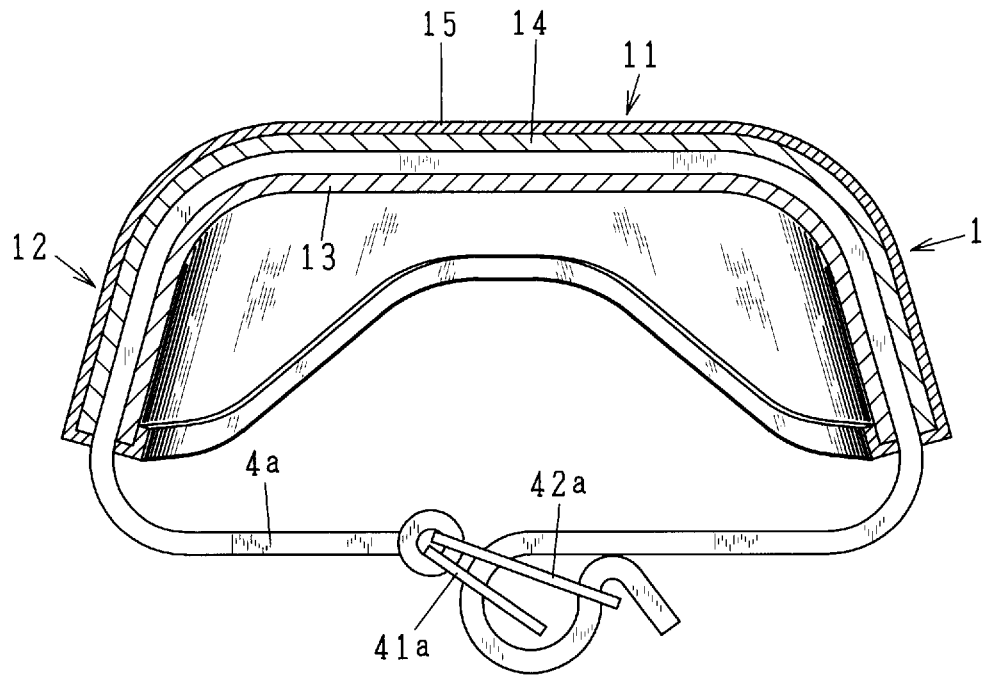
FIG. 6 is a transverse sectional view showing a saddle for use on a bicycle according to a second embodiment of the present invention.
Figure 7:
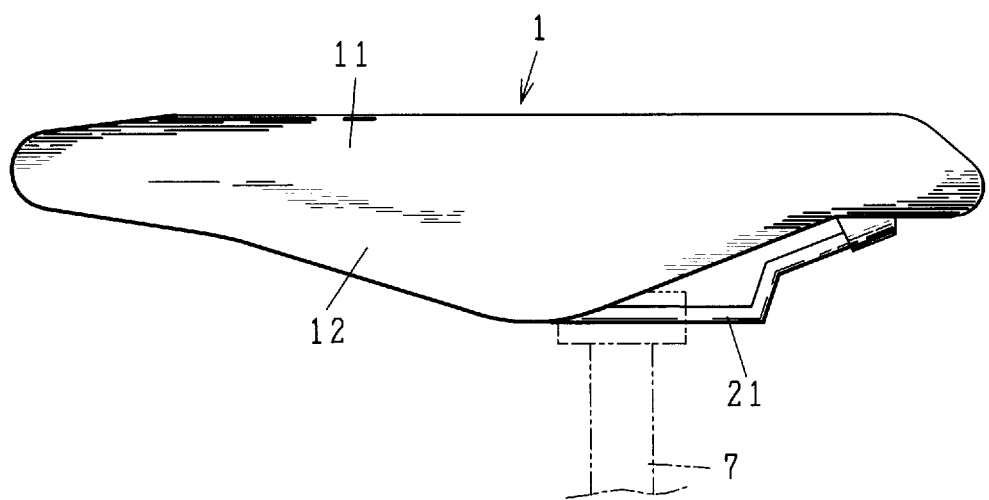
FIG. 7 is a side view showing a conventional saddle for use on a bicycle.

FIG. 6 shows a saddle body according to a second embodiment of the present invention in a transverse cross section.

Referring to this drawing, a binding band (4a) is passed from the lower end of one of the laterally facing pair of opposite walls in the component wall of the side plate (12) of the saddle body (1) to the lower end of the other one of the opposite walls through the inside of the component wall of the saddle body (1). The binding band (4a) has adjusting fittings (41a),(42a) at its one end for adjusting the binding band (4a) to a desired length.

Similarly to that shown in FIG. 1 according to the first embodiment, the saddle body (1) of this embodiment has a top plate (11) forming the top wall of the saddle and a side plate (12) hanging down from its periphery, the entirety of which is formed in the shape like a dome. The saddle body (1) is formed of a base (13) made of elastic resin, a sponge (14) covering the outside surface of the base (13), and a cover (15) covering the outside surface of the sponge (14). The binding band (4a) is wound on the outside surface of the base (13) in the width direction of the saddle body (1). This binding band (4a) is fitted in a hollow groove (having the same width as the binding band (4a)) formed on the outside of the base (13). Thus, the binding band (4a) is provided in the boundary between the base (13) and the sponge (14). Since the binding band (4a) thus applies the binding force to the entirety of the base (13), the durability of the saddle body (1) is improved as compared with that in the case where the binding force is applied through the insertion holes in the first embodiment.

D-shaped adjusting fittings (41a),(42a) are provided on one end of the binding band (4a). The adjusting fittings (41a),(42a) and the binding band (4a) form the degree-of-deformation adjusting means. When one end of the binding band (4a) is inserted through the adjusting fittings (41a), (42a) as shown in FIG. 6, the binding band (4a) is fixed at a desired length. Other five binding bands having the same structure as the binding band (4a) are provided at certain, i.e., predetermined intervals in the lengthwise direction over the saddle body (1).

Although the binding bands are not marked at all in the embodiments described above, marking the binding bands with degrees so that the binding lengths can be easily known will further improve the convenience in use.

While the invention has been described in detail, the foregoing description is in all aspects illustrative and not restrictive. It is understood that numerous other modifications and variations can be devised without departing from the scope of the invention.

I claim:

1. A saddle for use on a bicycle, comprising:

an elastically deformable saddle body, having a top plate forming a top wall of the saddle, and opposing side plates hanging down from a periphery of the top plate; and a degree-of-deformation adjusting arrangement, including at least one binding band inserted into said saddle body to extend in a lateral direction within said saddle body, from a lower end of one of the side plates, through the top plate, and out through a lower end of an other one of the side plates, and an adjusting fitting provided on an exposed part of said binding band for adjusting said binding band to a desired binding length.

2. The saddle according to claim 1, wherein said binding band is marked to indicate the binding length.

3. The saddle according to claim 1, wherein said degree-of-deformation adjusting arrangement holds a section modulus of a base, in a lateral section of said saddle body, at a desired value.

4. The saddle according to claim 1, wherein said saddle body includes a plurality of superposed layers, with said binding band being inserted between respective ones of the superposed layers.

5. The saddle according to claim 4, wherein said superposed layers include a base layer made of an elastic resin, a sponge layer covering an upper surface of said base layer, and a cover layer covering an upper surface of said sponge layer, said binding band being positioned at a boundary between said base layer and said sponge layer.

6. The saddle according to claim 5, wherein said saddle body has a laterally-extending groove located at the boundary between said base layer and said sponge layer, the laterally-extending groove having essentially a same width as said binding band, said binding band being received within the groove when said binding band is inserted into said saddle body.

7. The saddle according to claim 5, wherein said at least one binding band comprises a plurality of similarly configured binding bands, each of said plurality of binding bands being positioned at predetermined intervals in a longitudinal direction along said saddle body.

* * * * *